Dec. 21, 1965  V. J. QUIBELL  3,224,511
ROW CROP WEEDER AND THINNER
Filed July 9, 1964  2 Sheets-Sheet 1
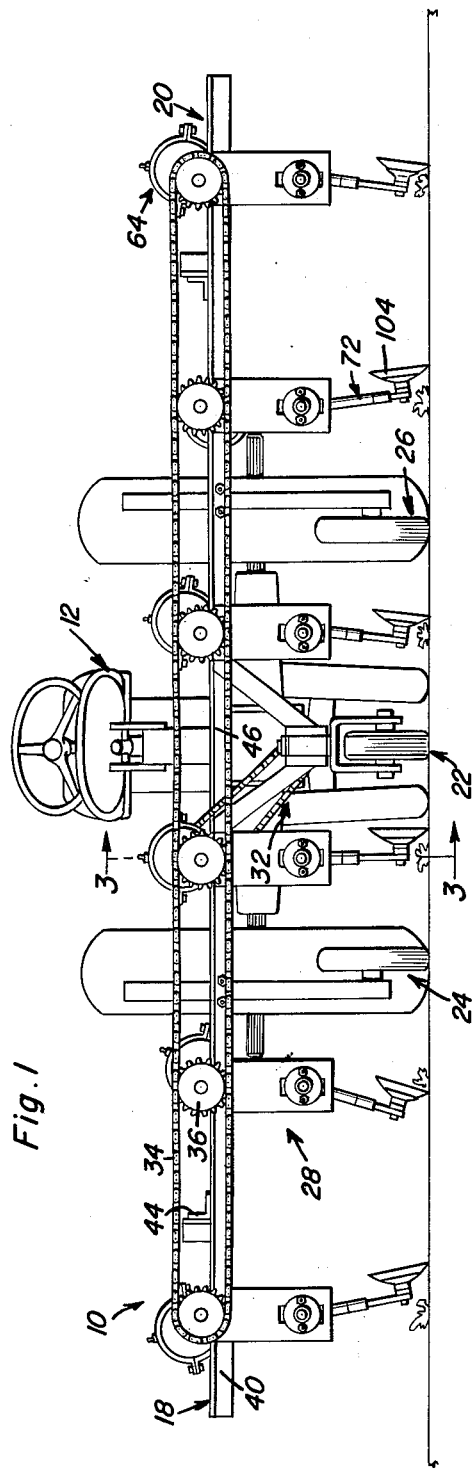
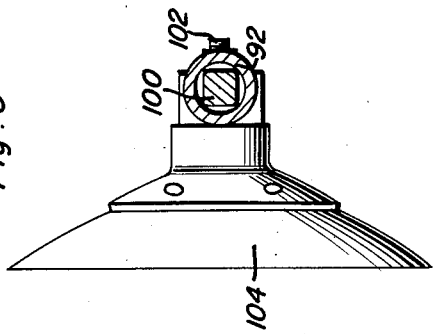
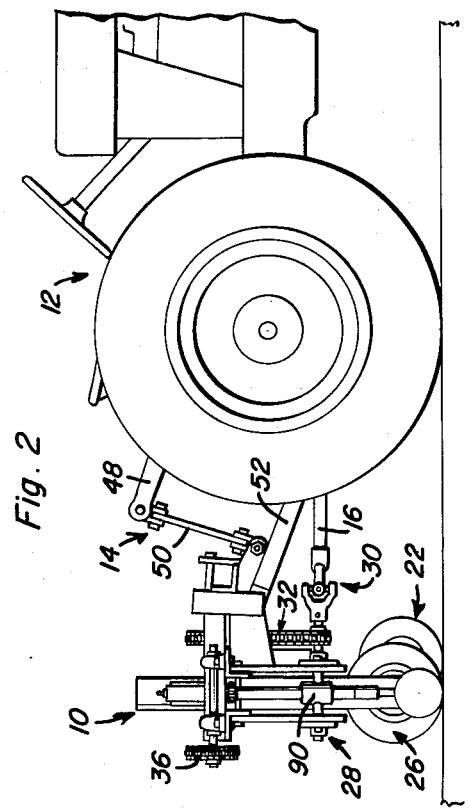
Vearl J. Quibell
INVENTOR.

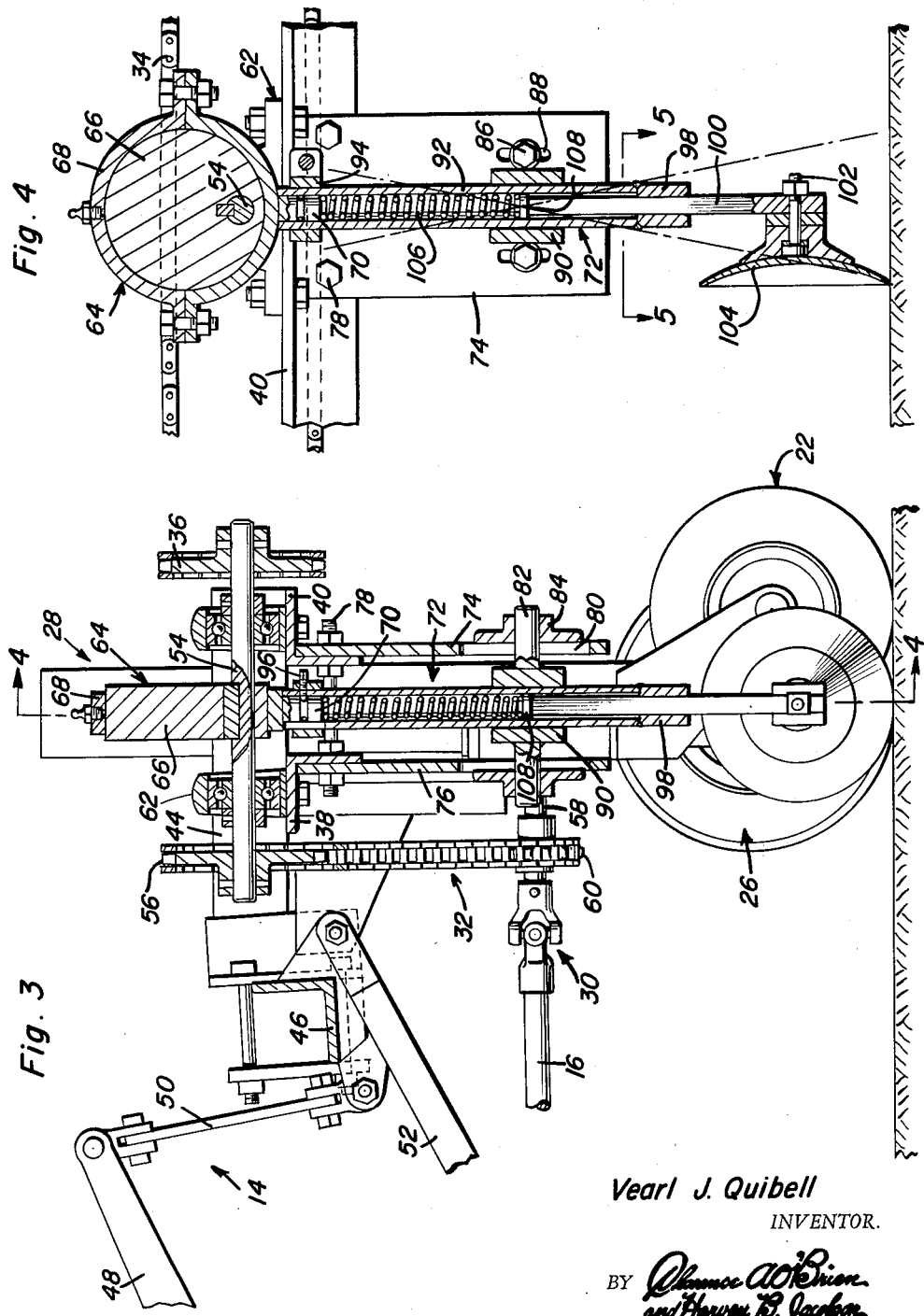

3,224,511
ROW CROP WEEDER AND THINNER
Vearl J. Quibell, Kennedy, Minn., assignor of fifty percent
to Douglas F. Quibell, Kennedy, Minn.
Filed July 9, 1964, Ser. No. 381,321
3 Claims. (Cl. 172—87)

This invention relates to agricultural implements for cultivating row crops, and more particularly, to a tractor powered device for weeding and thinning vegetation between plants growing in rows.

It is therefore a primary object of the present invention to provide a row crop thinning device adapted to be towed and powered by a tractor vehicle and capable of being readily adjusted for different thinning or weeding requirements as well as automatically regulated in accordance with varying soil density and earth irregularities.

In accordance with the foregoing object, the plant weeding and thinning device of the present invention may include a plurality of tractor power units, each of said units including a vertically reciprocating and oscillating tool by means of which spaced portions of a plant row may be cleared of vegetation. The thinning or weeding tool is accordingly driven from the power take-off shaft of the tractor. The oscillatory stroke of the tool and its angular position may be adjusted in accordance with different requirements. Also, for a given depth of soil penetration, the weeding and thinning tool is automatically operative so as to produce a self-cleaning action as well as to protect the tool against soil irregularities.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a rear elevation view of the crop weeding and thinning implement of the present invention.

FIGURE 2 is a side elevational view of the implement shown hitched to a towing tractor vehicle.

FIGURE 3 is an enlarged sectional view taken substantially through a plane indicated by section line 3—3 in FIGURE 1.

FIGURE 4 is a sectional view taken substantially through a plane indicated by section line 4—4 in FIGURE 3.

FIGURE 5 is an enlarged sectional view taken substantially through a plane indicated by section line 5—5 in FIGURE 4.

Referring now to the drawings in detail, it will be observed from FIGURES 1 and 2, that the crop weeding and thinning implement of the present invention is generally denoted by reference numeral 10. The implement 10 is also shown in association with a towing tractor vehicle 12 having a conventional type of 3 point power operated hitch mechanism 14 by means of which the implement 10 is towed in trailing relation to the tractor vehicle. The tractor vehicle is also provided with a rearwardly extending power take-off shaft 16 through which the implement is driven.

In one form of the invention, the implement 10 may include two frame sections 18 and 20 interconnected at a central caster wheel assembly 22 providing wheeled support between the frame sections which extend laterally beyond the tractor vehicle. Each frame section is also supported by wheel assemblies 24 and 26. The wheel assemblies 24 and 26 being adjustable in a vertical direction relative to the frame section control the depth of soil penetration by a plurality of laterally spaced units 28 mounted by the frame sections 18 and 20. One of the units 28 is directly driven by a power take-off shaft 16 through a universal coupling 30 and a drive sprocket assembly 32. This unit is in turn drivingly connected to all of the other units by a laterally extending, endless sprocket chain 34 enmeshed with sprocket wheels 36 associated with each of the units 28.

Each of the frame sections includes a pair of laterally extending angle frame members 38 and 40 as more clearly seen in FIGURE 3, these angle frame members being interconnected in spaced apart relation by cross frame members 44. The cross frame members 44 are in turn secured to a laterally extending tool bar 46 to which the upper elevating arm 48 of the hitch mechanism 14 is connected by the link 50. Also connected to the tool bar 46 are the lower towing links 52 of the hitch mechanism. The units 28 on each lateral side of the towing vehicle will thereby be supported the proper distance above the ground with a certain degree of lateral flexibility so as to accommodate ground irregularities.

With continued reference to FIGURE 3, it will be observed that the sprocket drive 32 from the power take-off shaft 16 imparts powered rotation to a drive shaft 54. Secured to the rear of the drive shaft 54, is the drive sprocket 56 associated with the sprocket drive 32 which also includes a jack shaft 58 rotatably mounted by the frame section about a fixed axis. Secured to the jack shaft, is the sprocket 60 vertically spaced below the drive sprocket 56. The drive shaft 54 is also rotatably mounted about a fixed axis by means of a pair of spaced bearing assemblies 62 respectively secured to the angle frame members 38 and 40. The sprocket 36 is secured to the rear end of the drive shaft 54 so that it may be drivingly engaged with the laterally elongated sprocket chain 34 by means of which all of the other units 28 are simultaneously driven.

Each of the units 28 as more clearly seen in FIGURES 3 and 4, includes an eccentric drive mechanism generally referred to by reference numeral 64. The eccentric drive mechanism is therefore provided with an eccentric disc member 66 splined to the drive shaft 54 so as to be driven thereby. Rotatably mounted on the eccentric disc member 66, is an eccentric sleeve assembly 68. One of the sections of the eccentric sleeve assembly includes a grooved stub shaft 70 by means of which the eccentric drive mechanism is operatively connected to a yieldable extensible rod assembly generally referred to by reference numeral 72. The extensible rod assembly being connected to the eccentric sleeve assembly, will undergo a reciprocatory movement upon rotation of the drive shaft 54. The movement is accordingly constrained by establishment of a fixed pivot axis vertically spaced below the axis of the drive shaft 54. Toward this end, a pivot shaft assembly is provided in the form of a pair of bearing support plates 74 and 76 secured to the angle frame members 40 and 38 by fastener bolt assemblies 78. Each of the bearing support plates 74 and 76 are provided with aligned vertical slots 80 through which aligned pivot pins 82 extend, these pivot pins being rotatably mounted by pivot bearing members 84 adjustably mounted on the bearing support plates by the adjustment fasteners 85 extending through bearing adjustment slots 88. The pivot pins 82 thereby establish a pivot axis disposed in parallel spaced relation to the axis of the drive shaft 54 and vertically spaced therebelow by an adjustable amount. The pivot axis so established intersects the longitudinal axis extending through the yieldable extensible rod assembly 72. The rod assembly is therefore slidably mounted by the pivot assembly along the longitudinal axis thereof by being slidably received through a sleeve member 90 to which the pivot pins 82 are connected.

The yieldably extensible connecting rod assembly 72 includes a vertical elongated tubular member 92 which is circular in cross-section and is slidably received through the pivot sleeve member 90. The upper end portion of the tubular member is slotted so that it may be clamped about the stub shaft 70 by the clamping collar 94 in order to secure the tubular member to the eccentric driving mechanism in an angularly adjusted position relative to the longitudinal axis of the rod assembly. The clamping collar 94 and the tubular member 92 are held in axially assembled relation to the stub shaft 70 by means of a set screw element 96 received in the annular groove formed in the stub shaft 70 for this purpose. Connected to the lower end of the tubular member as by welding is a slide bearing socket member 98 arranged to slidably receive a tool shank 100. The tool shank and the internal bore of the slide bearing socket 98 are non-circular in cross-section as more clearly seen in FIGURE 5 so that the tool shank 100 will be angularly fixed relative to the tubular member 92. It will therefore be apparent, that the angular position of the tool element 104 about the longitudinal axis of the connecting rod assembly may be adjusted by the clamping collar 94 in order to accommodate different requirements. Also mounted within the tubular member 92 is a compression spring 106 which reacts between the stub shaft 70 and a circular thrust flange 108 secured to the upper end of the tool shank 100 within the tubular member.

It will be apparent from the foregoing description, that each unit 28 will undergo a complete operational cycle when the eccentric disc member 66 completes 360° rotation. During this rotational cycle, the tool element 104 will be impelled into the soil along the longitudinal axis of the rod assembly 72. In the position illustrated in FIGURE 4, it will therefore be noted that the tool element 104 is withdrawn from the soil so that 180° rotation of the eccentric disc member 66 from the illustrated position will impel the tool element into the soil to a maximum depth. While the tool element is being impelled into the soil, it will also be oscillated about the pivot axis established through the pivot pins 82 in order to clear vegetation within the arc of oscillation. By adjusting the position of the pivot axis, the oscillatory arc of the tool element 104 may be varied accordingly. Also, the distance penetrated by the tool element because of the reciprocation of the rod assembly along its longitudinal axis, will be determined by the adjustment of the supporting wheel assemblies 24 and 26. Of particular importance however, is the fact that the depth to which the tool element penetrates the soil will be regulated by the compression of spring 106 in accordance with varying soil densities. Also, upon withdrawal of the tool 104 from the soil during the upstroke of the rod assembly, a snap action occurs as the load on the compression spring 106 is relieved, setting up a vibratory movement which is operative to dislodge any clinging earth from the tool element. This self-cleaning action of the unit 28 is of considerable advantage. It will also be appreciated, that the enclosure of the compression spring 106 within the tubular member will avoid any damage thereto and will also provide protection for the tool element inasmuch as the compression spring will correspondingly yield in response to any overload imposed on the tool element.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A crop thinning unit adapted to be mounted on a wheeled trailing frame towed by a towing vehicle having a power takeoff shaft, said unit comprising a pair of supporting members suspended from the frame in spaced relation above the ground having aligned slots therein, a sleeve, bearing means pivotally mounting said sleeve about a pivot axis extending through the slots in the supporting members, a tubular member slidably mounted by said sleeve for reciprocable movement, means adjustably positioning the bearing means within said slots, eccentric drive means rotatably mounted by the frame about an axis vertically spaced above the pivot axis, means connecting said eccentric drive means to the tubular member for imparting reciprocable movement thereto, a tool shank received within said tubular member and projecting therefrom toward the ground, a tool connected to the tool shank for penetrating the ground, bearing means mounted on the tubular member for slidably mounting the tool shank in non-rotatable relation to the tubular member, spring means enclosed within the tubular member and engageable with the tool shank for urging the tool into engagement with the ground, and means drivingly connecting the power takeoff shaft to the eccentric drive means, said eccentric drive means including an eccentric sleeve rotatably mounted on an eccentric disc, said connecting means between the eccentric drive means and the tubular member including a stub shaft secured to the eccentric sleeve and received within the tubular member, clamp means securing the tubular member in angularly adjusted relation to the stub shaft, and means releasably securing the clamp means and the tubular means in axially assembled relation to each other.

2. A crop thinning unit adapted to be mounted on a wheeled trailing frame being towed by a towing vehicle having a power take-off shaft, said unit comprising, an eccentric drive mechanism rotatably mounted by the frame about a fixed axis, pivot means for establishing a pivot axis disposed in parallel spaced relation below said fixed axis, bearing means operatively mounted on the frame for vertically adjusting the position of the pivot means thereon, yieldably extensible rod means slidably mounted by the pivot means intermediate opposite ends for movement along a longitudinal axis intersecting said pivot axis, a tool connected to one end of said rod means in angularly fixed relation to said longitudinal axis, clamp means for securing the other end of said rod means to the eccentric drive mechanism in angularly adjusted relation to the longitudinal axis, and means drivingly connecting the power takeoff shaft to the eccentric drive means for cyclically impelling the tool into the soil along said longitudinal axis while being oscillated about the pivot axis.

3. The combination of claim 2 wherein said rod means comprises, an elongated tubular member circular in cross-section, a non-circular slide bearing socket connected to a lower end of the tubular member, a tool shank slidably mounted by the slide bearing socket and connected to said tool, said tool shank projecting into the tubular member and having a thrust flange connected thereto within the tubular member, and spring means engageable between the thrust flange and the clamp means within the tubular member for urging the tool shank downwardly, said tubular member being slidably received by the pivot means between the fixed axis and the slide bearing socket.

References Cited by the Examiner

UNITED STATES PATENTS

| | | | |
|---|---|---|---|
| 585,484 | 7/1897 | Shafer | 172—84 X |
| 959,774 | 5/1910 | Martin | 172—85 X |
| 1,644,315 | 10/1927 | Torres | 172—705 X |
| 2,043,075 | 6/1936 | Smith | 172—85 |
| 2,791,952 | 5/1957 | Couiello | 172—85 X |
| 2,980,190 | 5/1961 | Hannagan | 172—58 |

FOREIGN PATENTS

| | | |
|---|---|---|
| 223,964 | 10/1924 | Great Britain. |
| 884,214 | 12/1961 | Great Britain. |
| 580,703 | 8/1958 | Italy. |

ABRAHAM G. STONE, *Primary Examiner.*